May 11, 1954

M. G. BALES 2,678,365

IGNITION DISTRIBUTOR

Filed Nov. 16, 1950

INVENTOR
Max G. Bales
By Willits, Hardman & Fehr
HIS ATTORNEYS

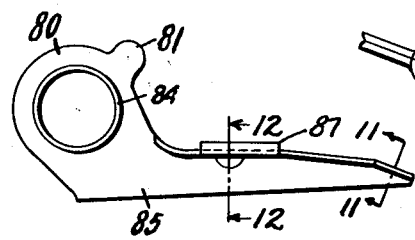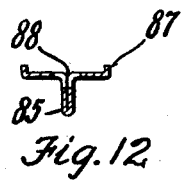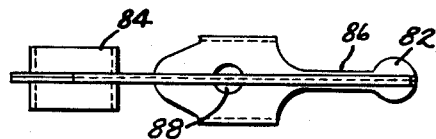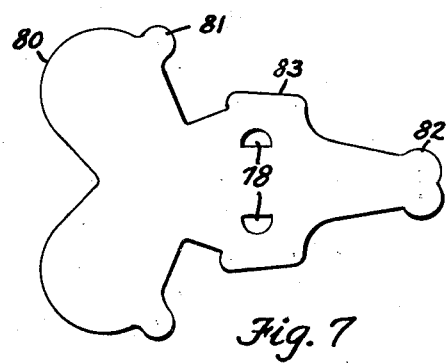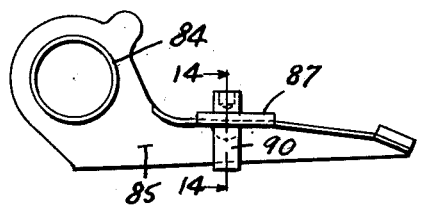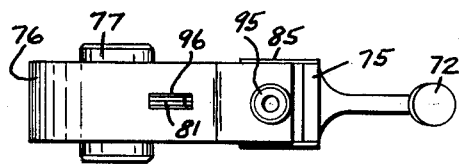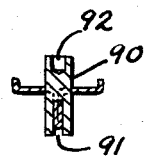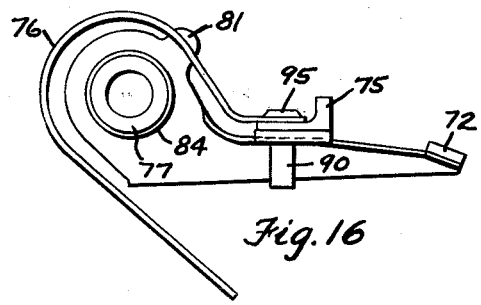

May 11, 1954 — M. G. BALES — 2,678,365
IGNITION DISTRIBUTOR
Filed Nov. 16, 1950 — 3 Sheets-Sheet 3

INVENTOR
MAX G. BALES
By Willits, Hardman & Fehr
HIS ATTORNEYS

Patented May 11, 1954

2,678,365

UNITED STATES PATENT OFFICE 2,678,365

IGNITION DISTRIBUTOR

Max G. Bales, Anderson, Ind., assignor to General Motors Corporation, Detroit, Mich., a corporation of Delaware Application November 16, 1950, Serial No. 196,045

5 Claims. (Cl. 201—63)

This invention relates to improvements in ignition apparatus having a distributor rotor and a cam operated circuit breaker.

An object of the present invention is to provide certain improvements in the construction of the distributor rotors which is compact and adapted to be easily assembled to suppress or substantially eliminate ignition interference with highly sensitive radio set. This object is accomplished by having the spark gap electrode molded in the rotor body and by the use of a detachable high tension conductor having a resilient ear and resistance so that the resilient ear of the conductor will constantly urge the resistance element in direct contact with the electrode, said conductor having the contact portion for engaging the center contact of a distributor head.

Further objects and advantages of the present invention will be apparent from the following description, reference being had to the accompanying drawings wherein a preferred embodiment of the present invention is clearly shown.

Figure 3:
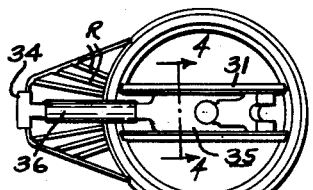
Fig. 3 is a plan view of a rotor body used in the present invention.
Figure 4:
Fig. 4 is a fragmentary sectional view drawn to a larger scale and taken on line 4—4 of Fig. 3.
Figure 2:
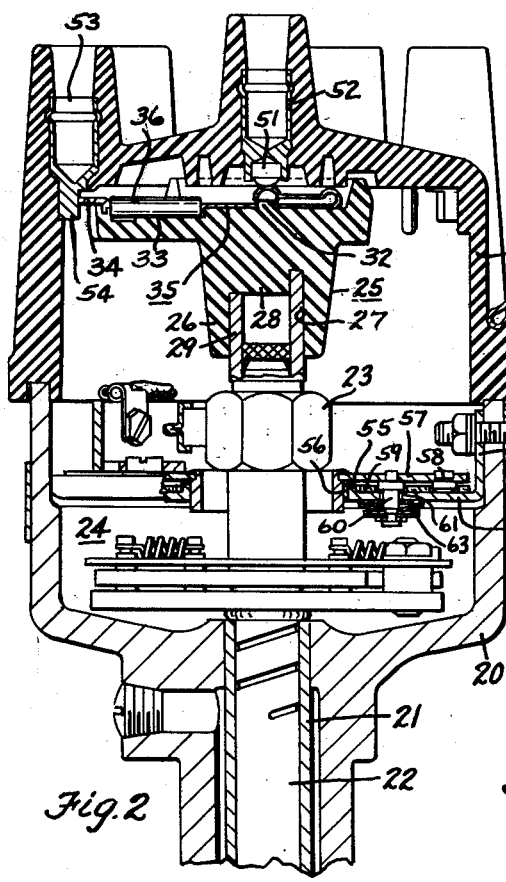
Fig. 2 is a sectional view taken on line 2—2 of Fig. 1.
Figure 1:
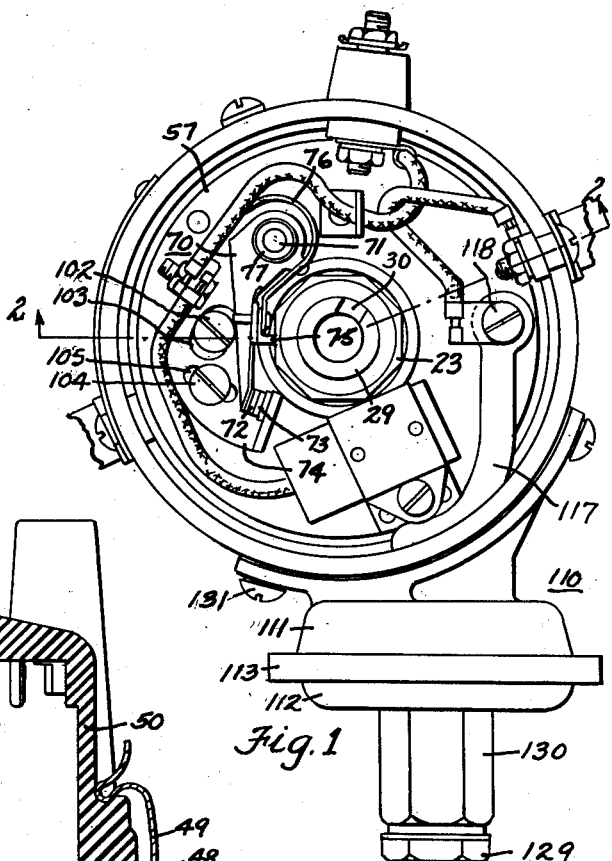
Fig. 1 is a plan view of an ignition timer embodying the improvements of the present invention, with the distributor cap removed.
Figure 20:
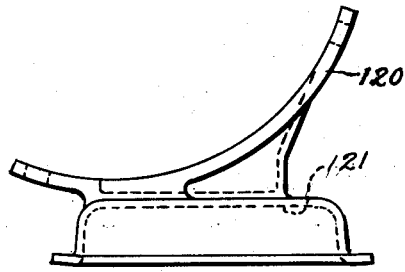
Figure 18:
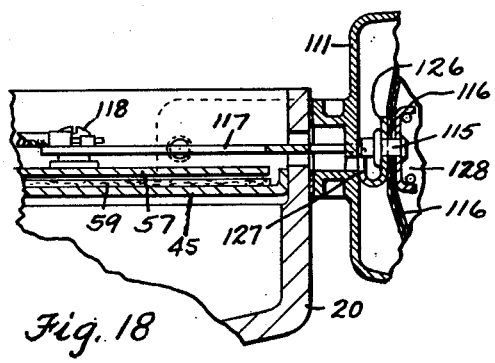

Referring to Figs. 1 and 2, 20 designates a timer housing having a bearing 21 which supports for rotation an engine driven shaft 22. A timer cam 23 is mounted on the shaft 22 which is drivingly connected with the shaft by a speed responsive device 24 capable of changing the angular relation between the shaft 22 and the cam 23. The cam 23 detachably supports and drives a body or rotor 25 which may be made of molded phenolic plastic or some other appropriate non-conductive material. To mount the rotor 25 with the cam 23 the former is fashioned in the present instance on its underside with an extension 26 having a recess 27 formed with a lug 28 therein. When the extension 26 is fitted over a reduced extension 29 of the cam 23 a slot 30 provided by the extension drivingly receives the lug 28, see Fig. 2. The rotor is also formed with a pair of spaced elongated ribs 31, and a boss 32 between the ribs, and a channel or recess 33 on the upper side thereof. Before molding the rotor in its final form a metal insert or spark gap electrode 34 is placed in the mold cavity so that one end will extend slightly beyond the periphery of the body and the other end will be exposed in the channel 33. A plurality of ridges R are provided on opposite sides of the electrode 34, see Fig. 3 in order to provide a long leakage path for the secondary current.

As mentioned heretofore, the rotor is formed with spaced ribs 31, a boss 32 and a channel 33. This makes provision for supporting a metallic leaf spring 35 and a resistance element 36.

Figure 5:
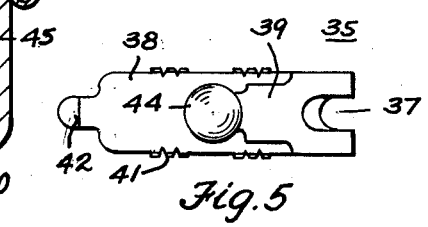
Figs. 5 and 6 are plan and side views, respectively, drawn to a larger scale, of a conductor strip used with the present invention.
Figure 6:
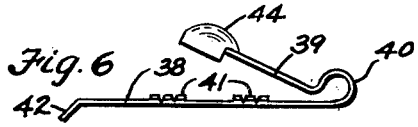
Figure 19:
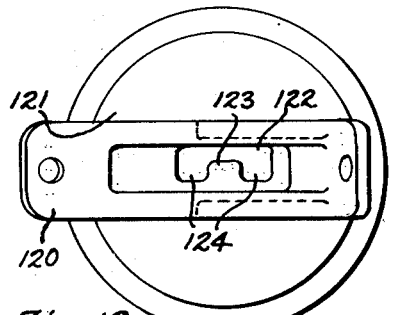
Figure 17:
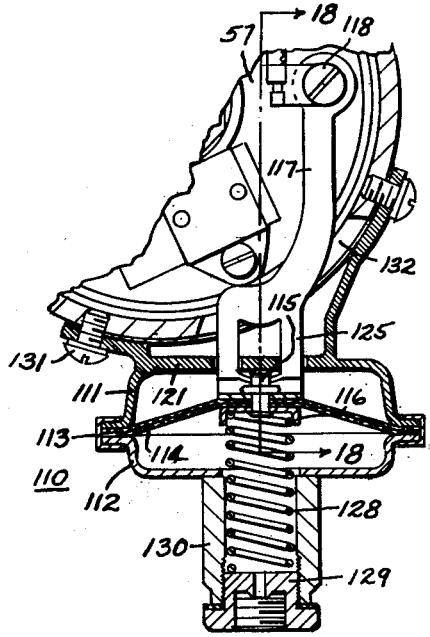

In this instance, the leaf spring, as shown in Figs. 5 and 6, is formed of a single strip of resilient material preferably in rectangular form having an elongated slot 37. The extremities are folded back upon themselves in overlapped relation intermediate the length of the slot 37 to provide a U-shaped member having leg portions 38 and 39 and a cylindrical portion 40, the legs 38 being longer than leg 39. The reason for bending the strip at the point intermediate the slot is to increase the resiliency of the legs 39. The long leg 38 is provided with transverse prongs or tongues 41. These tongues are bent upwardly at an obtuse angle so as to make them resilient. The cross dimensions of the arm at points including the transverse tongues is greater than the space between the ribs 31. The end of the long arm is reduced to provide an ear or tang 42 which is bent downward from the normal plane of the arm 38. Arm 39 has an opening which receives the lug 32 to locate properly the arm 38 between the ribs 31 when leaf spring 35 is assembled with the rotor body 25. By this arrangement, reciprocable horizontal movement of the arms with respect to the upper face of the body 25 is prevented. The short arm 39 is deformed at its end to provide a spherical contact surface 44.

Since the cross dimension of the arm 38 at the points including the resilient tongues 41 is greater than the space between the ribs 31 the arm 38 must be forced into the space between the ribs 31. This forcing operation causes the tongues 41 to yield after the arm 38 is pushed between the ribs to its final position, and the force released, the resilient tongues 41 will bite into inner walls of the ribs 31 to hold or lock the arm 38 in place against axial movement relative to the rotor 25. When the spring is in position on the rotor the tongue 42 will extend into the channel and spaced sufficiently from the inner end of insert to prevent jumping of spark from ear 42 to segment 34. The resistance element is forced into the channel 33 between the segment 34 and the resilient ear 42 against the tension of ear 42. By this arrangement the resistance element is in electrical engagement with the electrode 34 and ear 42. The resilient ear 42 urges the element 36 firmly against the electrode 34 exposed within the channel. Before the element 36 is inserted in the channel the bottom of the channel is coated with a suitable cement.

A stationary plate 45 is supported within the housing 20 and has three ears 46 each of which has a threaded aperture to receive a screw 47. These screws secure the plate 45 in position within the housing. Two of the screws 47 secure brackets 48 to the housing each of which hingedly support a clamp spring 49 which holds a distributor cap 50 upon the housing.

The distributor cap 50 supports a central button 51 supported by a metal terminal socket 52 anchored centrally in the cap 50 of molded insulating material. The cap is held in the housing in the conventional manner by the spring clips 49. The cap 50 is provided with a circular row of terminal sockets 53 each adapted to make connection with a spark plug cable and each terminal socket has a post 54 past which rotates the insert 34 supported by the rotor 25 connected with the leaf spring conductor 35.

The stationary plate 45 is provided with a central aperture defined by an annular flange 55 having a cylindrical bearing surface concentric with the bearing 21. The flange 55 has an arcuate recess extending inwardly from the bearing surface of the flange to receive a leaf spring 56 of the type disclosed and claimed in the copending application of John T. Fitzsimmons, Serial No. 81,433, filed March 15, 1949, now Patent No. 2,610,264.

A movable circuit breaker plate 57 is supported on the stationary plate 45. The plate 57 carries a plurality of bearing buttons 58 located near the periphery of the plate 55. The lower ends of the button 58 have convex surfaces which contact the upper face of the plate 45 to reduce friction to a minimum. The lower end of the buttons extend through apertures provided by a felt washer 59 saturated with lubricant which lubricates the upper face of the stationary plate 45.

The movable plate 57 carries a stud 60 extending through a suitable hole in the felt washer 59 and an arcuate slot 61 in the plate 45. After assembling the plate 57 with the plate 45, a nonmetallic bearing washer, a dished shaped washer 64 and one or more flat washers are placed around the stud 60 and a C-washer is placed in a groove provided by the stud to prevent accidental removal of the plate 57 from plate 45.

A circuit breaker lever 70 is pivotally and insulatingly mounted on a post or stud 71 attached to the movable plate 57. Referring to Fig. 1, the circuit breaker assembly 70 is in cooperable engagement with the cam 23 which operates to alternately open and close electrical circuits through the device. The lever 70 carries a contact point 72 for cooperation with a fixed contact point 73 on a bracket 74, a rubbing block 75 cooperable with the cam 23 for actuating the lever 70, and having a leaf spring 76 attached thereto, which when secured within the housing 20 operates to oscillate the lever 70 with its pivot bushing 77 about the post or stud 71 whereby circuits are alternately opened and closed through the points 72 and 73.

As mentioned heretofore, the lever 70 is pivotally supported on the stud 71 carried by the bracket 74 attached to a plate 55. The bracket 74 carries a fixed contact 73 engageable by the movable contact 72 carried by the lever 70. The other end of leaf spring is attached to an ear provided by the bracket 74. As viewed in Fig. 2, the spring 76 urges the lever in a counterclockwise direction to cause the contacts 72, 73 to be normally engaged and to resist separation thereof when a lobe of cam 23 engages the rubbing block 75.

The contact separation can be adjusted by rotating the bracket 74 about stud 70. This is accomplished by the turning of a slotted disc 102 received by a slot 103 in bracket 74. The disc has an eccentric shank journalled in the plate 57. The bracket is held in adjusted position by tightening a screw 104 passing through an arcuate slot 105 in the bracket and threaded in the plate 57.

For the purpose of oscillating plate 57, the plate is connected with a suction device 110. The suction device comprises a back casing 111 and a front casing 112 which are clamped together by a clamping ring 113 to enclose and embrace the usual actuating diaphragm, (not shown). The back casing 111 is provided with an arcuate bracket which is used to attach the suction device 110 to the housing 20 by means of screws 131. A link 117, attached to the diaphragm, extends through a slot in the housing and is connected to a plate 57 by a screw 118. When the suction device is thus connected, increase in engine suction will effect clockwise rotation of the plate to advance the spark. It will be understood that the cam rotates counterclockwise. Upon decrease in vacuum, a reverse action is accomplished by the suction device through the lever 117 attached to the plate 57.

While the embodiment of the present invention as herein disclosed, constitutes a preferred form, it is to be understood that other forms might be adopted.

What is claimed is as follows:

1. An ignition distributor rotor for suppressing spark interference of a radio apparatus comprising in combination; a molded body of insulating material, said body having a pair of spaced mutually extending ribs disposed on the top surface of the body and having an open-sided channel formed therein at one end of said ribs; a metallic insert molded in the body, said insert having one end exposed at the periphery of the body and having the other end exposed and positioned in one end of the channel; a resistance element disposed within the channel and having one end directly in contact with the insert end in said channel; a leaf spring conductor received between said ribs, said leaf spring having a conductor holding portion and a contact engaging portion arranged in resilient over-lapped relation, said holding portion being positioned on said body between said ribs and having its free extremity bent angular to the holding portion and positioned in the opposite end of said channel in yielding engagement with the other end of said resistance element; and resilient tongues provided along each of opposite edges of the holding portion engaging the ribs for locking said leaf spring to the body.

2. In a rotor for use with an ignition distributor the combination with an electrical connecting means of substantially U-shape, comprising a long planar leg having the free end bent out of the plane of the leg and adapted to engage a current conducting element, a short leg integrally connected to the long leg and formed therefrom with a substantially completely cylindrical bend in an overlapping relationship with said long leg, said short leg having its end portion adapted to engage another current conducting element associated with the rotor; and resilient tongues provided on opposite edges of the long leg, said tongues being oppositely bent relative to the free end of said long leg and providing means for locking said connecting means to the rotor.

3. In a rotor the combination with an electrical connecting means of substantially U shape comprising a first planar leg having its free end bent out of the plane of the leg and adapted to engage yieldingly a current conductor; a second leg integrally connected with the first leg and formed therefrom with a substantially completely cylindrical bend in an overlapping relationship with said first leg, said second leg being adapted to engage another current conductor carried by the rotor and oppositely disposed resilient tongues on opposite edges of the first leg bent therefrom in a direction opposite the direction of bend of said free end of said first leg and adapted to cooperate with portions of the rotor in a manner to hold the connecting means against rotative and axial movements with respect to the rotor.

4. In combination a rotor body having two mutually extending ribs thereon and an open sided channel formed in one face of the body at one end of said ribs; an insert carried by the rotor body and having one end exposed at the periphery of the rotor body and having the other end exposed within one end of the channel; a substantially U-shaped elongated conductor having one leg thereof positioned on said body between said ribs; a resilient tongue provided on the free end of said one leg of said U-shaped conductor, said tongue projecting into the opposite end of channel; a completely exposed resistance element located within the channel and frictionally secured between the insert and tongue for affecting electrical connection between said conductor and the insert; and side extending resilient prongs on said one leg, said prongs being oppositely disposed and engaging with the ribs for locking said one leg to the rotor body.

5. An ignition distributor rotor comprising, a molded body of insulating material, said body having spaced mutually extending ribs and a projection extending in one direction and an open sided channel extending in depth in an opposite direction relative to the top surface of the body and extending in length in the same direction as said ribs; an electrode secured to the body at the end of said channel remote from said ribs, said electrode having an exposed portion at the periphery of the body and an exposed portion in the channel at the said end thereof; a conductor of spring metal disposed between the ribs and having an opening receiving the projection whereby to prevent horizontal movement of the spring relative to the top surface of the body, said conductor having a resilient ear on one end thereof extending into the opposite end of said channel; said conductor having edge projecting portions cooperating with the ribs for locking the conductor to the body whereby to prevent axial movement of the conductor relative to the top surface of the body; and a resistance element disposed within the channel with one end engaging the electrode and with the other end engaging the resilient ear of the conductor for electrically connecting the conductor with the electrode.

References Cited in the file of this patent
UNITED STATES PATENTS

| Number | Name | Date |
|---|---|---|
| 1,278,202 | Pehrsson | Sept. 10, 1918 |
| 1,863,362 | Wurdack | June 14, 1932 |
| 1,931,625 | Schwarze | Oct. 24, 1933 |
| 2,014,018 | Dutterer | Sept. 10, 1935 |
| 2,025,191 | Davis | Dec. 24, 1935 |
| 2,033,005 | Pinkus | Mar. 3, 1935 |
| 2,509,094 | Fitzsimmons | May 23, 1950 |